(12) United States Patent
Liu et al.

(10) Patent No.: US 9,129,375 B1
(45) Date of Patent: Sep. 8, 2015

(54) POSE DETECTION

(75) Inventors: Qiang Liu, Cupertino, CA (US); Samuel Henry Chang, San Jose, CA (US)

(73) Assignee: Rawles LLC, Wilmington, DE (US)

( * ) Notice: Subject to any disclaimer, the term of this patent is extended or adjusted under 35 U.S.C. 154(b) by 466 days.

(21) Appl. No.: 13/455,949

(22) Filed: Apr. 25, 2012

(51) Int. Cl.
| | | |
|---|---|---|
| *G06T 15/00* | (2011.01) | |
| *G06T 7/00* | (2006.01) | |
| *H04N 7/54* | (2006.01) | |
| *H04N 9/31* | (2006.01) | |
| *G06T 3/00* | (2006.01) | |
| *G06T 19/00* | (2011.01) | |
| *H04N 9/28* | (2006.01) | |

(52) U.S. Cl.
 CPC .............. *G06T 7/0038* (2013.01); *G06T 3/0068* (2013.01); *G06T 7/0022* (2013.01); *G06T 7/0046* (2013.01); *H04N 7/54* (2013.01); *H04N 9/31* (2013.01); *G06T 19/00* (2013.01); *H04N 9/28* (2013.01)

(58) Field of Classification Search
 CPC ............ G06T 19/00; G06T 2219/2016; G06T 7/0079; G06T 15/00; G06T 7/0038; G06T 7/0081; G06T 7/0089; G06K 9/4604
 USPC ......................................................... 345/651
 See application file for complete search history.

(56) References Cited

U.S. PATENT DOCUMENTS

| 7,418,392 | B1 | 8/2008 | Mozer et al. |
|---|---|---|---|
| 7,720,683 | B1 | 5/2010 | Vermeulen et al. |
| 7,774,204 | B2 | 8/2010 | Mozer et al. |
| 8,249,391 | B2* | 8/2012 | Curtis ........................ 382/289 |
| 2009/0322860 | A1* | 12/2009 | Zhang et al. ................ 348/46 |
| 2012/0223885 | A1 | 9/2012 | Perez |

FOREIGN PATENT DOCUMENTS

WO   W02011088053  A2   7/2011

OTHER PUBLICATIONS

Raskar, Ramesh, et al., "Multi-projector displays using camera-based registration." Visualization'99. Proceedings. IEEE, 1999.*
Ababsa, Fakhr-eddine, and Malik Mallem., "Robust camera pose estimation using 2d fiducials tracking for real-time augmented reality systems." Proceedings of the 2004 ACM SIGGRAPH international conference on Virtual Reality continuum and its applications in industry. ACM, 2004.*
Raskar, Ramesh, et al., "iLamps: geometrically aware and self-configuring projectors." ACM SIGGRAPH 2006 Courses. ACM, 2006.*
Rosenhahn, Bodo, et al., "A comparison of shape matching methods for contour based pose estimation." Combinatorial Image Analysis. Springer Berlin Heidelberg, 2006. 263-276.*
Tsai, Andy, et al. "A shape-based approach to the segmentation of medical imagery using level sets." Medical Imaging, IEEE Transactions on 22.2 (2003): 137-154.*

(Continued)

*Primary Examiner* — Mark Zimmerman
*Assistant Examiner* — Sarah Le
(74) *Attorney, Agent, or Firm* — Lee & Hayes, PLLC (57) ABSTRACT

Techniques are described for determining the pose of an object based on a 3D point set representing the object. The 3D point set is rotated into a 2D coordinate system and a model object contour is aligned with the contour of the rotated point set using an iterative process. The aligned model object contour is then rotated back into the original 3D coordinate system, where its pose is assumed to represent the pose of the object.

27 Claims, 3 Drawing Sheets

(56) References Cited

OTHER PUBLICATIONS

Chui, Haili, et al. "Unsupervised learning of an atlas from unlabeled point-sets." Pattern Analysis and Machine Intelligence, IEEE Transactions on 26.2 (2004): 160-172.*

Marques, Jorge S., and Arnaldo J. Abrantes. "Shape alignment—optimal initial point and pose estimation." Pattern Recognition Letters 18.1 (1997): 49-53.*

Pinhanez, "The Everywhere Displays Projector: A Device to Create Ubiquitous Graphical Interfaces", IBM Thomas Watson Research Center, Ubicomp 2001, 18 pages.

* cited by examiner

POSE DETECTION

BACKGROUND

A large and growing population of people is enjoying entertainment through consumption of digital content items, such as music, movies, images, books and so on. Many people today consume digital content through a wide variety of electronic devices. Among these electronic devices are cellular telephones, personal digital assistants (PDAs), electronic book readers, portable media players, tablets, netbooks and the like.

As more content is made available in digital form, people continue to consume more and more of this content. In addition, this population expects digital content to become more and more accessible and ubiquitous.

Although content has become easier to obtain, a number of issues remain. For example, people may have difficulty determining and locating the appropriate device to use for a particular action. In addition, once the device is identified, the device still needs to be operable and properly configured to perform the desired task.

BRIEF DESCRIPTION OF THE DRAWINGS

The detailed description references the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems and techniques for detecting the position and orientation of a known or expected object. In certain embodiments, the object may comprise a rectangular sheet or other passive display medium, onto which visual content is to be projected. The display medium for example, may be held by a user, and the user may move the display medium in different ways through a room or other environment. As the user and the display medium move, the position and orientation of the display medium are detected so that an image can be projected correctly onto the display medium.

For example, the described systems and techniques may allow the user to read an electronic book, watch a video, view images, or otherwise consume any other form of projected content on the display medium.

The display medium may be obscured in places where it is being grasped by the user. In addition, the user may occasionally point to portions of the projected image or take other actions that obscure portions of the display medium. The techniques described herein are capable of identifying the position and orientation of the display medium even under such conditions of partial occlusion.

A three-dimensional (3D) point set representing the observed surface of an approximately planar display medium is converted to a two-dimensional (2D) coordinate system by applying of a calculated rotation matrix. Edge points of the resulting 2D point representation are then identified to produce a 2D contour, which will be referred to herein as the data contour or the observed contour.

A 2D model contour is constructed, based on a known or expected size and shape of the display medium. Various techniques are then used to align the model contour to the observed contour. The alignment may utilize iterative closest point (ICP) minimization, which is an iterative process used to minimize the difference between two point sets. However, during each iteration of ICP, edge points that were not closely aligned during previous iterations may be discarded or ignored. This allows alignment to be accomplished even when there are anomalies in the observed contour resulting from occlusion.

When the model contour has been aligned with the observed contour in the 2D coordinate system, the rotation matrix mentioned above is applied in an inverse manner to convert the model contour to the original 3D coordinate system, in which it accurately represents the position and orientation of the observed display medium.

Example Environment

Figure 1:
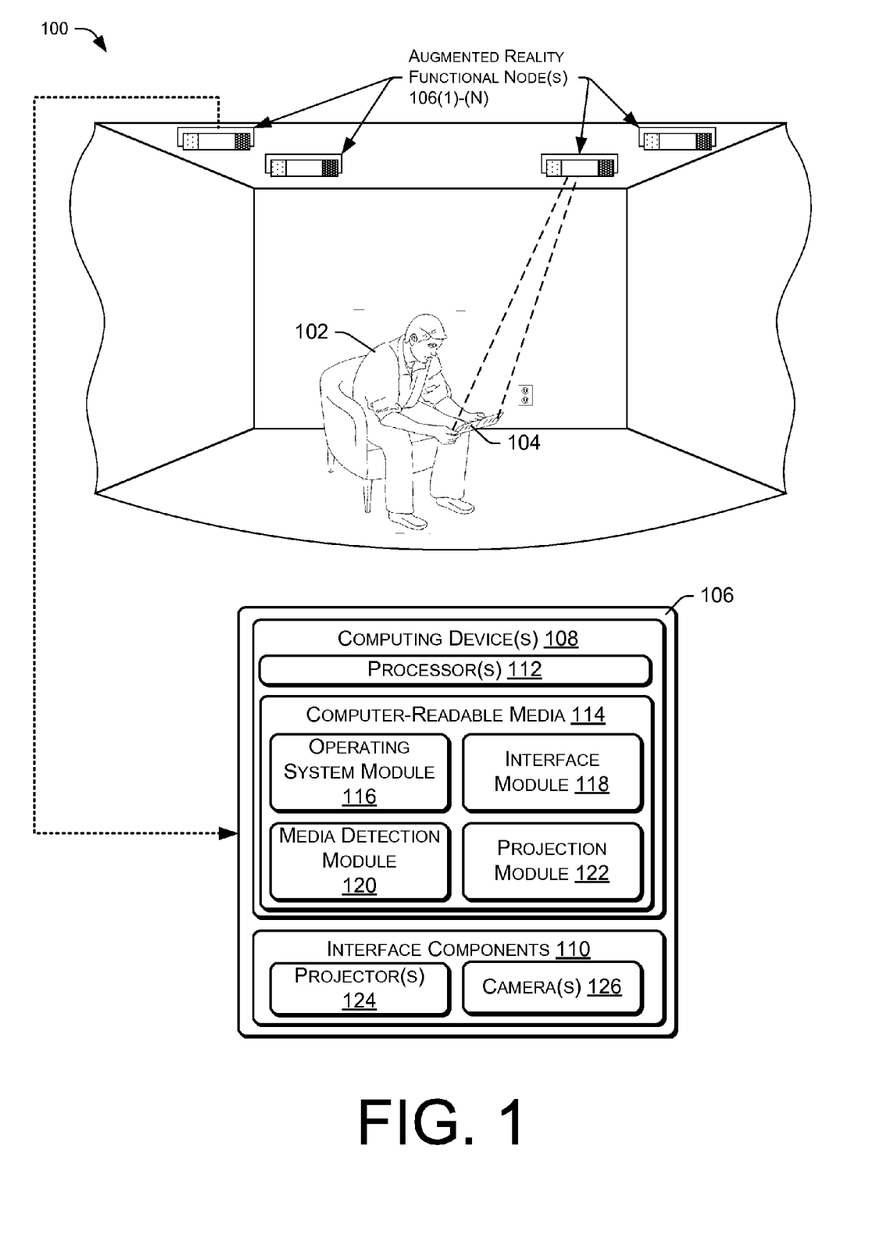
FIG. 1 illustrates an environment that includes an augmented reality functional node (ARFN) that detects the pose of a handheld display medium for projecting content onto the display medium.

FIG. 1 illustrates an example environment 100 in which a user 102 consumes content that is projected onto a passive or non-powered handheld display medium 104 by one or more augmented reality functional nodes (ARFNs) 106(1), . . . , 106(N) (collectively referred to as "the ARFN 106" in some instances). It is to be appreciated that the techniques described herein may be performed by a single ARFN, by a collection of any number of ARFNs, or by any other devices or combinations of devices.

The projected content may include any sort of multimedia content, such as text, color images or videos or any other visual content. In some cases, the projected content may include interactive content such as menus and controls.

Each ARFN 106 may include one or more computing devices 108, as well as one or more interface components 110. The computing devices 108 and interface components 110 may be configured in conjunction with each other to interact with the user 102 within the environment 100. In particular, the ARFN 106 may be configured to project content onto the display medium 104 for viewing by the user 102.

The computing device 108 of the example ARFN 106 may include one or more processors 112 and computer-readable media 114. The processors 112 may be configured to execute instructions, which may be stored in the computer-readable media 114 or in other computer-readable media accessible to the processors 112. The processor(s) 112 may include digital signal processors (DSPs), which may be used to process audio signals and/or video signals.

The computer-readable media 114, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 108. The computer-readable media 114 may reside within a housing of the ARFN, on one or more storage devices accessible on a local network, on cloud storage accessible via a wide area network, or in any other accessible location.

The computer-readable media 114 may store various modules, such as instructions, datastores, and so forth that are configured to execute on the processors 112. For instance, the computer-readable media 114 may store an operating system module 116 and an interface module 118.

The operating system module 116 may be configured to manage hardware and services within and coupled to the computing device 108 for the benefit of other modules. The interface module 118 may be configured to receive and interpret commands received from users within the environment 100, and to respond to such commands in various ways as determined by the particular environment.

The computer-readable media 114 may also include a media detection module 120 that is executable to perform certain processing as described below. In particular, the detection module 120 may implement the techniques described below for determining the pose of the display medium 104 within the environment 100.

The computer-readable media 114 may further include a content projection module 122 that is executable to project content onto the display medium 104. The projection module 122 may receive the pose of the display medium 104, and may manipulate the projected content so that it appears correctly on the display medium 104 after accounting for the current pose of the display medium. For example, the projection module 122 may vary the size, location, orientation and aspect ratio of the projected image. The projection module 122 may also use techniques such as keystone correction to correct the appearance of the projected image in situations where the projection source is not aligned with the display medium. For example, the projected image may be intentionally distorted to account for a non-perpendicular alignment of the display medium with respect to the projection source. In some situations, the projected image may also be distorted to correct for irregularities or non-planar characteristics of the display medium.

The computer-readable media 114 may contain other modules, which may be configured to implement various different functionality of the ARFN 106.

The ARFN 106 may include various interface components 110, such as user interface components and other components that may be used to detect and evaluate conditions and events within the environment 100. As examples, the interface components 110 may include one or more projectors 124 and one or more cameras 126. The interface components 110 may in certain implementations include various other types of sensors and transducers, content generation devices, and so forth, including microphones, speakers, range sensors, and other devices.

The projector(s) 124 may be used to project content onto the display medium 104 for viewing by the user 102. In addition, the projector(s) 124 may project patterns, such as non-visible infrared patterns, that can be detected by the camera(s) 126 and used for 3D reconstruction and modeling of the environment 100. The projector(s) 124 may comprise a microlaser projector, a digital light projector (DLP), cathode ray tube (CRT) projector, liquid crystal display (LCD) projector, light emitting diode (LED) projector or the like.

The camera(s) 126 may be used for various purposes, such as determining the location of the user 102, detecting user gestures, determining the poses of the medium 104 and objects within the environment 100, reconstructing 3D characteristics of objects within the environment 100, and so forth. Various forms of structured light analysis may be used in conjunction with the camera(s) 126 to reconstruct 3D properties of the environment 100. Other techniques and image sensors may also be used for this purpose, such as range finders, depth sensors, and devices that analyze optical or audio time-of-flight observations.

The coupling between the computing device 108 and the interface components 110 may be via wire, fiber optic cable, wireless connection, or the like. Furthermore, while FIG. 1 illustrates the computing device 108 as residing within a housing of the ARFN 106, some or all of the components of the computing device 108 may reside at another location that is operatively connected to the ARFN 106. In still other instances, certain components, logic, and/or the like of the computing device 108 may reside within a projector or camera. Therefore, it is to be appreciated that the illustration of the ARFN 106 of FIG. 1 is for illustrative purposes only, and that components of the ARFN 106 may be configured in any other combination and at any other location.

Furthermore, additional resources external to the ARFN 106 may be accessed, such as resources in another ARFN 106 accessible via a local area network, cloud resources accessible via a wide area network connection, or a combination thereof. In still other instances, the ARFN 106 may couple to and control other devices within the environment, such as televisions, stereo systems, lights, and the like.

In other implementations, the components of the ARFN 106 may be distributed in one or more locations within the environment 100. For example, the camera(s) and projector (s) may be distributed throughout the environment and/or in separate chasses.

In operation, the user 102 simply picks up the passive display medium 104. In response, the ARFN 106 recognizes and detects the location and orientation of the medium 104, and begins projecting content onto the medium 104. The user 102 is then able to observe or consume the projected content as well as navigate to other content, just as the user would be able to do using a traditional portable electronic device.

The ARFN 106 may also track the location and orientation (pose) of the medium 104 and continue to project an image onto the medium 104 at different locations within the environment as the medium moves. Thus, the user 102 is able to move about within the room and continue to consume the projected content. The ARFN 106 may distort or otherwise manipulate the projected image to account for different orientations, sizes and shapes of the medium 104, as well as for varying distances between the ARFN 106 and the medium 104.

The media detection module 120 is configured to repeatedly and continuously detect the 3D pose of the display medium 104. The detection module 120 passes this information to the projection module 122. In response, the projection module directs the projected image onto the medium 104 at the detected location, and adjusts the projected image to account for size and pose of the display medium relative to the projector 124. The detection module 120 may continue to track the pose of the medium 104 as the user 102 and the medium 104 move, and may continue to pass motion information along to the projection module 122. By doing so, the projection module 122 is able to correctly project the content onto the medium 104 even as the pose of the medium 104 changes.

In the embodiment described herein, the display medium 104 may have any desired size and shape. The display medium 104, as an example, may comprise a 3 by 5 inch card or an 8.5 by 11 inch sheet of plain white paper. Alternatively, the medium 104 may be any object having an approximately planar surface upon which images can be projected. The surface of the medium 104 may also be irregular or non-planar in some embodiments.

Overall Process

Figure 2:
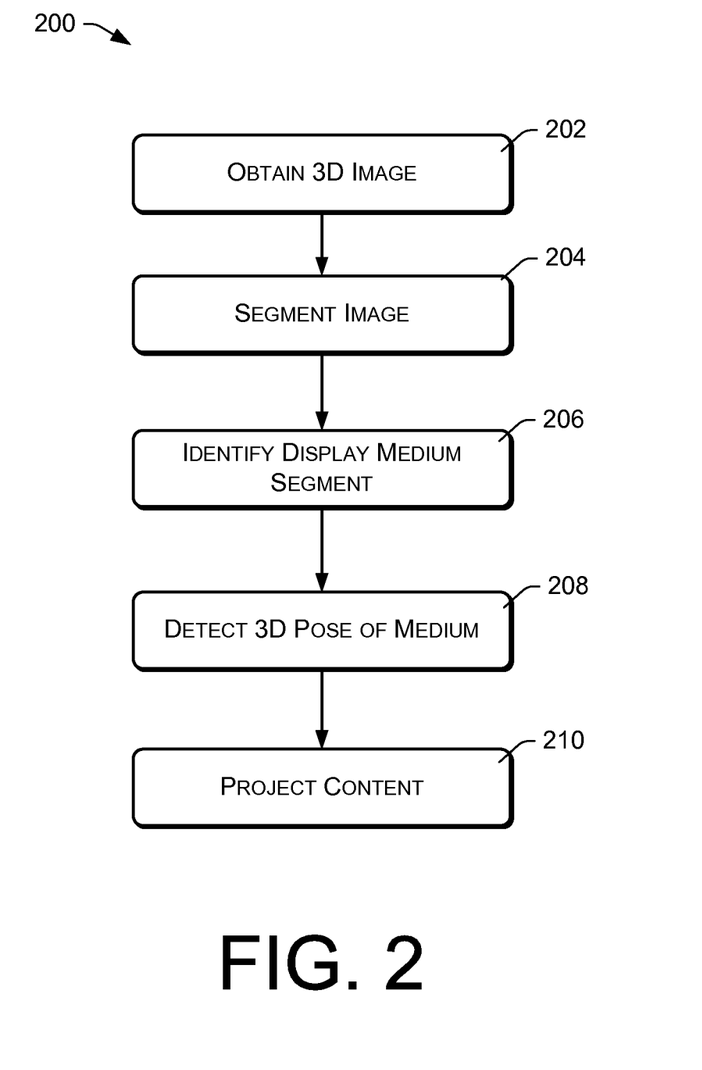
FIG. 2 is an example flow diagram of an ARFN locating a handheld display medium and projecting content onto the display medium.

FIG. 2 illustrates an example method 200 of locating and tracking the pose of a passive, reflective, or translucent medium such as the handheld medium 104 of FIG. 1, and of projecting content onto the medium 104. The method is described with reference to the environment of FIG. 1, although various aspects of the method may be utilized in different environments, using different types of components.

An action 202 comprises obtaining a 3D image of the environment 100. The 3D image may comprise a depth map or 3D point cloud obtained, calculated, or reconstructed by the ARFN 106 in conjunction with the projector 124 and camera 126. For example, the ARFN 106 may utilize structured light analysis do determine the distance of surface points viewed by the camera 126. Specifically, the projector 124 may project a structured light pattern onto the scene within the environment 100, and the camera 126 may capture an image of the reflected light pattern. Deformation in the reflected pattern, due to a lateral displacement between the projector 124 and the camera 126, may be analyzed by the ARFN 106 to determine depths or distances corresponding to different points, areas, or pixels within the environment 100. Other types of systems may alternatively be utilized to obtain a 3D image of the environment, such as techniques involving time-of-flight observations.

An action 204 comprises segmenting the 3D image to generate multiple 3D point sets corresponding to different surfaces within the 3D image. Segmenting may be performed using surface normals that represent the orientation of local surfaces in a 3D point set (K. Klasing, D. Althoff, D. Wollherr, and M. Buss: Comparison of Surface Normal Estimation Methods for Range Sensing Applications, Proc of IEEE ICRA 09). A surface normal is a unit vector that extends perpendicularly from the center of a surface. Initial segmentation may be performed with respect to such surface normals. Surfaces containing smoothly varying surface normals may be clustered by various techniques. For example, an algorithm known as the watershed transformation may be used for initial segmentation (Olsen, O. and Nielsen, M.: Multi-Scale Gradient Magnitude Watershed Segmentation, Proc. of ICIAP 97). Further processing, including merging and splitting identified segments, may be performed in different embodiments. For planar surface segmentation, a segment resulting from surface normal clustering may be processed by a plane estimation routine such as random sample consensus (RANSAC) plane estimation. Surfaces with similar plane equations may be merged into one segment, or split vice versa.

An action 206 may comprise analyzing and/or comparing the identified segments and their respectively corresponding 3D point sets to identify one or more of the segments that are likely to represent or contain the display medium 104. This may be performed in accordance with various object recognition techniques. In some embodiments, methods of relatively low complexity may be used to initially evaluate the likelihood that a particular segment contains the display medium. For example, assuming that the display medium 104 is white, the action 206 may identify segments that are predominately white. Other properties or characteristics of the display medium may similarly be used. For example, the action 206 may perform a rough search based on the general shape, size, or aspect ratio of the display medium, without attempting to conclusively determine whether any given segment contains the display medium. Furthermore, this analysis may be performed on relatively sparse data, in order to further reduce the complexity of processing.

An action 208 may comprise detecting the 3D pose of the display medium, by examining the 3D point set of those segments identified in the action 206 that are most likely to contain the display medium 104. This action will be described in more detail below, with reference to FIG. 3.

An action 210 may comprise projecting content onto the display medium 104, while accounting for its current and/or anticipated 3D pose. For example, the projector 124 may be directed to pan, zoom, or rotate its projected image to follow the display medium 104.

Pose Detection

Figure 3:
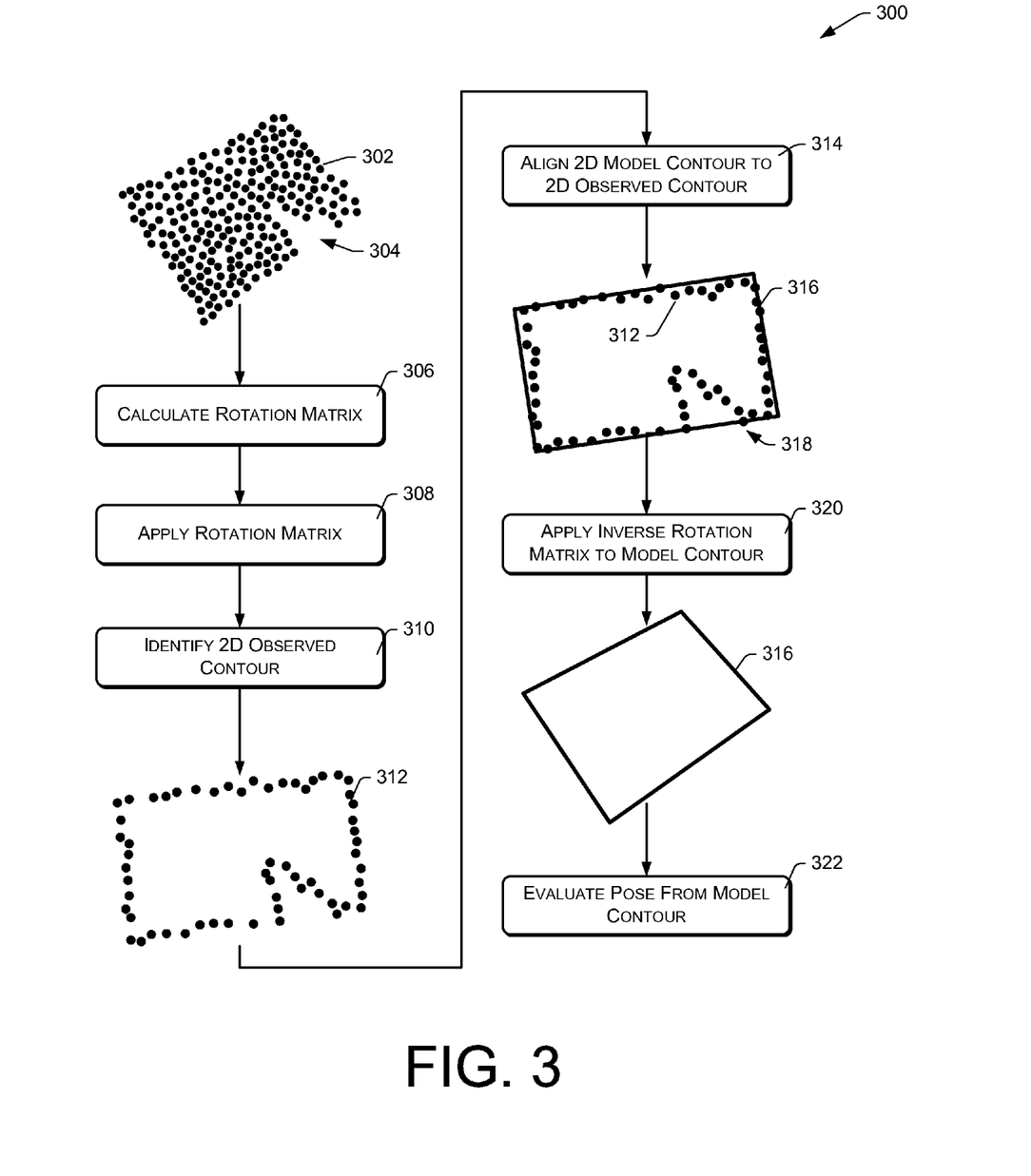
FIG. 3 is an example flow diagram of an ARFN determining the 3D pose of the display medium.

FIG. 3 shows an example method 300 of determining the location and/or orientation of the display medium 104, based on a depth map or point set 302 representing an observation of the medium 104 with respect to a three-dimensional (3D) coordinate system.

The 3D point set 302 may be obtained as described above, using structured light analysis or some other technique in conjunction with the projector 124 and the camera 126, and by identifying one or more image segments that most likely represent the display medium 104. The discussion below assumes that the 3D point set represents an observation of the surface of the display medium 104 or at least a portion of the display medium. The discussion also assumes that the normal of the surface, referred to herein as the surface normal, is approximately known as a result of the segmenting action 204 described above. If not, the surface normal may be calculated using RANSAC plane estimation. The 3D point set may, however, contain anomalies due to occlusion of the display medium by the user or by other objects. In the illustrated example, the 3D point set 302 has an anomaly 304, possibly created by the placement of a user's hand over the display medium.

A pair of actions 306 and 308 are performed to rotate the 3D point set 302 so that can it can be represented within a 2D coordinate space. More specifically, the 3D point set 302 is rotated into two dimensions of the original 3D coordinate system, into a plane formed by the X and Y axes of the 3D coordinate system.

The action 306 comprises determining or calculating a rotation value, such as a rotation matrix, for the surface normal vector of the 3D point set 302 such that application of the rotation matrix to the surface normal vector will bring the surface normal vector into perpendicular alignment with the two-dimensional reference plane formed by the X and Y axes of the 3D coordinate system. The rotation matrix has three columns, each column containing a 3D vector. The third column of the rotation matrix consists of the surface normal vector of the 3D point set 302. To determine the other two columns, an arbitrary 3D vector is chosen such that it is not collinear with the surface normal vector. The first column of the rotation matrix is then computed as the cross product of the surface normal vector and this arbitrarily chosen vector. The second column is computed as the cross product of the resulting first column and the third column.

The action 308 comprises rotating the 3D point set into two dimensions of the 3D coordinate system. This is performed by applying the rotation matrix to each point of the 3D point set 302. This effectively converts the 3D point set so that it can be represented as a 2D point set in the X and Y dimensions of the camera's coordinate system.

An action 310 comprises identifying a 2D contour or boundary 312 of the 2D point set, which will be referred to herein as the data contour or observed contour. The observed contour 312 includes the points lying on the outermost edges or periphery of the rotated point set, specified relative to the X and Y axes of the camera coordinate system. To calculate or construct the observed contour 312, an intensity threshold may be applied to the points of the 2D point set to create a binary 2D image. Specifically, intensity or brightness values of the 2D point set may be compared to an intensity threshold to produce a black-and-white or monochrome 2D image. The binary 2D image may in turn be smoothed or otherwise filtered. Boundary or edge points may be identified using various available techniques (H. Edelsbrunner, D Kirkpatrick, and R. Seidel: On the Shape of a Set of Points in the Plane, IEEE Transactions on Information Theory, July, 1983).

An action 314 may comprise aligning a 2D model contour 316 with the 2D observed contour 312. The 2D model contour 316 is constructed in accordance with a known size and shape of the display medium 104, and includes the edge or boundary points corresponding to the edges of such a display medium. Aligning the model contour 316 with the observed contour 312 may be performed using various techniques, including iterative closest point (ICP) minimization and principal component analysis (PCA). In certain embodiments, the aligning 314 may be performed in a first, rough alignment phase and a second, fine alignment phase.

A first or rough alignment may be performed by initially estimating the position and orientation of the 2D observed contour 312. The estimated position may be calculated as the center of the 2D observed contour 312, by averaging the individual points of the 2D observed contour. The estimated rough orientation may be calculated using PCA in the 2D coordinate system to find a rotation matrix for the model contour 316 that will most closely align it with the observed contour 312. The model contour 316 is then translated in accordance with the estimated center and 2D orientation, in order to roughly align the model contour 316 with the data contour 312.

In some cases, particularly where there are significant occlusions affecting the observed contour 312, the initial estimation may be further refined using a repetitive search to find an optimum rough initial orientation. For example, a search range may be defined that includes a predefined rotation angle of the model contour 316 around the initial PCA-derived alignment described above. At each angle within the search range, the distance between the points of the model contour 316 and the observed contour 312 is evaluated, and the angle producing the shortest cumulative distance is chosen as the initial rough alignment of the model contour.

The second or fine alignment of the model contour 316 to the observed contour 312 may be performed using ICP minimization techniques, which comprise minimizing differences between the periphery points of the model contour 316 and the observed contour 312. To account for the possibility of anomalies in the observed contour 312 resulting from occlusions of the display medium 104, the ICP algorithm may be implemented so that each iteration ignores those points of the respective contours which were least closely aligned during the previous iteration. As an example, in the region designated by reference numeral 318 of the model contour 316, the ICP algorithm will indicate relatively distant matches between the observed contour 312 and the model contour 316. Points which are least closely aligned may be ignored during subsequent ICP iterations. Points may be ignored or excluded based on a predefined distance threshold or on a dynamically calculated threshold. As further iterations are performed, the process will eventually converge, resulting in relatively close matches for all remaining points under consideration.

An action 320 is then performed, which comprises applying an inverse rotation matrix to the 2D model contour, converting it back into 3D space. The inverse rotation matrix is the inverse of the rotation matrix identified by the action 306, when initially converting the 3D point set 302 to 2D space.

After being rotated in this manner, the model contour 316 accurately represents the position and orientation of the display medium 104 with respect to the original 3D coordinate system. An action 322 comprises evaluating the pose of the display medium based on the pose of the model contour 316.

The technique shown in FIG. 3 can be used to dynamically detect the pose of a passive display medium in an environment. The technique is particularly useful in situations where portions of the display medium may be occluded, such as might happen when a user puts his or her hand over the display surface or medium.

Conclusion

Although the subject matter has been described in language specific to structural features, it is to be understood that the subject matter defined in the appended claims is not necessarily limited to the specific features described. Rather, the specific features are disclosed as illustrative forms of implementing the claims

What is claimed is:
1. A system comprising:
one or more processors;
an imaging sensor;
a projector;
one or more computer-readable media storing computer-executable instructions that, when executed by the one or more processors, cause the one or more processors to perform acts comprising:
    observing, based at least in part on the image sensor, at least a portion of a display medium;
    determining a point set corresponding to the observed display medium with respect to a 3D coordinate system;
    rotating the point set into two dimensions of the 3D coordinate system by applying a rotation value to the point set;
    identifying an observed contour comprising periphery points of the rotated point set;
    aligning a model contour with the observed contour, the model contour comprising periphery points of an expected display medium;
    inversely applying the rotation value to the aligned model contour to rotate the model contour into three dimensions of the 3D coordinate system;
    evaluating a position and orientation of the display medium based on the aligned and rotated model contour; and
    using the projector to project content onto the display medium at the evaluated position and orientation of the display medium.

2. The system of claim 1, wherein the rotation value comprises a rotation matrix.

3. The system of claim 1, the acts further comprising:
determining a surface normal of the observed display medium based at least in part on the point set; and
determining the rotation value based at least in part on the surface normal of the observed display medium.

4. The system of claim 1, the acts further comprising:
determining a surface normal of the observed display medium based at least in part on the point set; and determining the rotation value as a rotation matrix that rotates the surface normal of the observed display medium into the two dimensions of the 3D coordinate system.

5. The system of claim 1, wherein the aligning comprises minimizing differences between the periphery points of the model contour and the periphery points of the observed contour.

6. The system of claim 1, wherein the aligning comprises:
minimizing differences between the periphery points of the model contour and the periphery points of the observed contour in iterations; and
during successive iterations of the minimizing, ignoring periphery points that are least closely aligned.

7. The system of claim 1, wherein the aligning comprises iterative closest point (ICP) minimization to minimize distances between the periphery points of the model contour and the periphery points of the observed contour in successive iterations, and wherein each iteration of the minimization ignores one or more periphery points that were least closely aligned in a previous iteration of the minimization.

8. The system of claim 1, the acts further comprising estimating alignment of the model contour with the observed contour prior to performing the aligning.

9. The system of claim 1, the acts further comprising estimating alignment of the model contour with the observed contour prior to performing the aligning, wherein the estimating is based at least in part on principal component analysis (PCA).

10. The system of claim 1, the acts further comprising estimating alignment of the model contour with the observed contour prior to performing the aligning, wherein the estimating is based at least in part on averaging the periphery points of the observed contour to determine a center of the observed contour.

11. The system of claim 1, wherein the display medium is rectangular.

12. A method of determining a pose of an object, comprising:
obtaining a point set representing an observation of at least a portion of the object with respect to a 3D coordinate system;
rotating the point set into two dimensions of the 3D coordinate system by applying a rotation value to the point set;
aligning a model contour with a data contour, the model contour comprising periphery points corresponding to the object, the data contour comprising periphery points of the rotated point set; and
inversely applying the rotation value to the aligned model contour.

13. The method of claim 12, wherein the rotation value comprises a rotation matrix.

14. The method of claim 12, further comprising:
determining a surface normal of the observed display medium based at least in part on the point set; and
determining the rotation value based at least in part on the surface normal of the observed display medium.

15. The method of claim 12, further comprising:
determining a surface normal of the observed display medium based at least in part on the point set; and
determining the rotation value as a rotation matrix that rotates the surface normal of the observed display medium into the two dimensions of the 3D coordinate system.

16. The method of claim 12, wherein the aligning comprises minimizing differences between the periphery points of the model contour and the periphery points of the data contour.

17. The method of claim 12, wherein the aligning comprises:
minimizing differences between the periphery points of the model contour and the periphery points of the data contour in iterations; and
during successive iterations of the minimizing, ignoring periphery points that are least closely aligned.

18. The method of claim 12, wherein the aligning comprises iterative closest point (ICP) minimization to minimize distances between the periphery points of the model contour and the periphery points of the data contour in successive iterations, and wherein each iteration of the minimization ignores one or more periphery points that were least closely aligned in a previous iteration of the minimization.

19. The method of claim 12, further comprising estimating alignment of the model contour with the data contour prior to performing the aligning, wherein the estimating is based at least in part on principal component analysis (PCA).

20. The method of claim 12, further comprising estimating alignment of the model contour with the data contour prior to performing the aligning, wherein the estimating is based at least in part on averaging the periphery points of the data contour to determine a center of the data contour.

21. One or more non-transitory computer-readable media storing computer-executable instructions that, when executed by one or more processors, cause the one or more processors to perform acts comprising:
obtaining an observed point set representing at least a portion of an observed object in a 3D coordinate system;
rotating the observed point set into two dimensions of the 3D coordinate system;
creating an observed contour representing periphery points of the rotated observed point set;
creating a model contour representing periphery points of an expected object;
aligning the model contour with the observed contour; and
inversely rotating the aligned model contour into the 3D coordinate system.

22. The one or more non-transitory computer-readable media of claim 21, wherein the 2D coordinate system comprises two dimensions of the 3D coordinate system.

23. The one or more non-transitory computer-readable media of claim 21, wherein the aligning comprises minimizing differences between the periphery points of the model contour and the periphery points of the observed contour.

24. The one or more non-transitory computer-readable media of claim 21, wherein the aligning comprises:
minimizing differences between the periphery points of the model contour and the periphery points of the observed contour in iterations; and
during successive iterations of the minimizing, ignoring periphery points that are least closely aligned.

25. The one or more non-transitory computer-readable media of claim 21, wherein the aligning comprises iterative closest point minimization (ICP) to minimize distances between the periphery points of the model contour and the periphery points of the observed contour in successive iterations, and wherein each iteration of the minimization ignores one or more periphery points that were least closely aligned in a previous iteration of the minimization.

26. The one or more non-transitory computer-readable media of claim 21, the acts further comprising estimating alignment of the model contour with the observed contour prior to performing the aligning, wherein the estimating is based at least in part on principal component analysis (PCA).

27. The one or more non-transitory computer-readable media of claim 21, the acts further comprising estimating alignment of the model contour with the observed contour prior to performing the aligning, wherein the estimating is based at least in part on averaging the periphery points of the observed contour to determine a center of the observed contour.

* * * * *